United States Patent [19]
Kawai

[11] 4,011,012
[45] Mar. 8, 1977

[54] OPERATION CONTROL DEVICE FOR COPYING APPARATUS

[75] Inventor: Yoshihisa Kawai, Aichi, Japan

[73] Assignee: Minolta Camera Kabushiki Kaisha, Osaka, Japan

[22] Filed: May 19, 1975

[21] Appl. No.: 579,111

[30] Foreign Application Priority Data
May 31, 1974   Japan ............... 49-63340[U]

[52] U.S. Cl. ................................. 355/55; 355/14
[51] Int. Cl.² ............................... G03B 27/52
[58] Field of Search ............... 355/54, 55, 14, 56

[56] References Cited
UNITED STATES PATENTS

| | | | |
|---|---|---|---|
| 3,169,441 | 2/1965 | Johnson | 355/54 X |
| 3,689,149 | 9/1972 | Livingood | 355/544 |
| 3,779,642 | 12/1973 | Ogawa et al. | 355/55 |

*Primary Examiner*—Richard A. Wintercorn
*Attorney, Agent, or Firm*—Wolder & Gross

[57] ABSTRACT

An electrophotographic copier having selectable magnification of the document image includes controls for preventing initiation of a copy production cycle during an operation changing optical elements from an existing magnification to a desired other magnification, and conversely for preventing initiation of a magnification change operation during a copy production cycle.

10 Claims, 4 Drawing Figures

4,011,012

OPERATION CONTROL DEVICE FOR COPYING APPARATUS

BACKGROUND OF THE INVENTION

1. Field of the Invention

The invention relates to electrophotographic apparatus having selectable magnification of the document image. More particularly, it relates to apparatus of that type having a number of lenses or other optical elements which are differentially movable into the optical path in response to the operator's selection of a particular magnification.

2. Description of the Prior Art

Electrophotographic apparatus with selectable magnification of the document image is known, but is subject to production of poor copies if operated in a careless or uninformed manner.

At the time of image projection during a reproduction cycle, if the projection magnification is changed by mistake, there results a movement of the optical system and as a consequence the reproduced copy thus obtained is of no use. Likewise, if a reproducing-projecting cycle is carried out by mistake during a change in the projection magnification, then a photosensitive paper or the like is wasted. Accordingly, it is desirable to provide means for preventing such an erroneous operation or error in workmanship.

SUMMARY OF THE INVENTION

It is an object of the present invention to provide an electrophotographic copying apparatus which provides for changing the projection magnification in a manner such that during the changing of the projection magnification, a reproducing-projecting operation cannot be carried out, and during the reproducing-projecting operation a change in magnification is not allowed.

According to the present invention, there is provided an operation control device for use in an electrophotographic copying apparatus, which device allows initiation of a reproducing operation by an AND combination of a signal indicating the completion of the projection-magnification changing operation and an instruction signal for starting the reproducing operation, and which allows changing of the projection magnification only in the presence of a signal indicating completion of the reproducing operation.

Description of the present invention will now be given in conjunction with the accompanying drawing which indicates an embodiment of the invention.

DETAILED DESCRIPTION OF THE INVENTION

Figure 1:
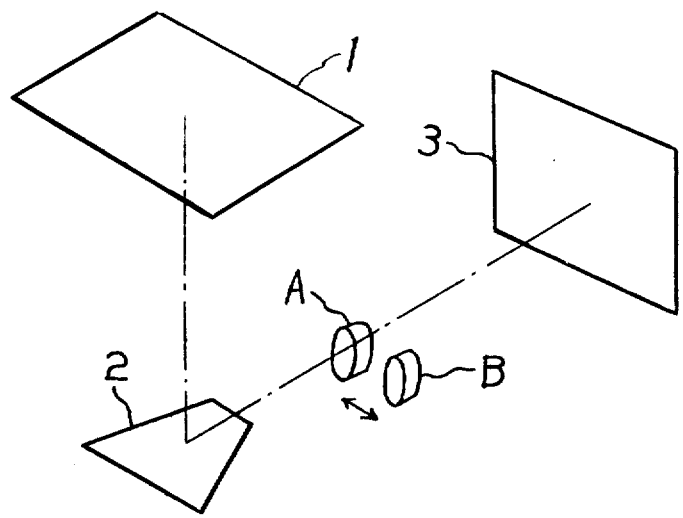
FIG. 1 is a perspective view of a general arrangement of the optical system of a reproducing apparatus which provides for changes in magnification.
Figure 2:
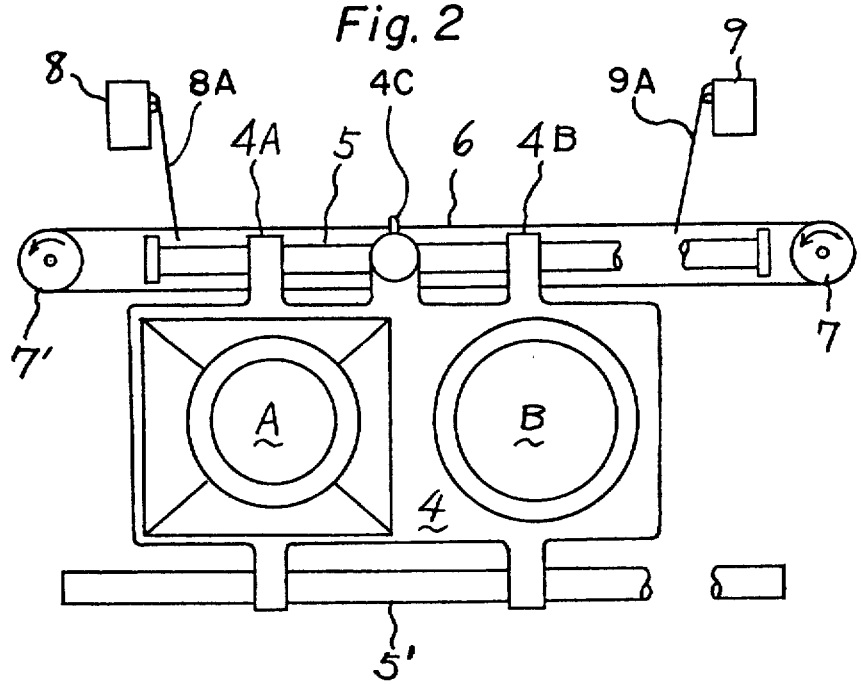
FIG. 2 is a front view of projection lenses according to one embodiment of the invention.

FIG. 1 shows a general arrangement of a reproducing apparatus which provides for a projection-magnification change. Shown at 1 is a document support, at 2 a mirror, and at 3 an image-forming surface of a photosensitive member. A and B are projection lenses having different focal lengths. In FIG. 1, lens A is positioned in the optical path of projection, and thus to change the magnification, the projection lenses A and B are moved in the horizontal direction such that projection lens B is put in the optical path. FIG. 2 is a front view of lenses A and B, which are held on a common frame 4, movable to the left and right by virtue of a pair of guide rods 5,5' on which it is slidably mounted. An endless wire loop 6 -- arranged with its runs in parallel with the guide rods 5,5' -- is trained around a pair of pulleys 7,7' located at the left and right, respectively, in FIG. 2. The pulleys 7,7' are rotated in a reversible manner by means of a motor M (not shown in FIG. 2). Since the upper run of wire 6 is secured to frame 4 at one point 4C, frame 4 will move either to the left or to the right upon rotation of the pulleys. More particularly, when the pulleys 7,7' rotate in the direction of the arrows shown, frame 4 moves to the left so that a projecting portion 4A (through which the guide rod 5 passes) abuts an actuator 8A of a microswitch 8 above the lens A, thereby closing the NO ("normally open") contact of microswitch 8. As will be seen more clearly from FIG. 3, due to closure of the NO contact of microswitch 8, a signal indicating completion of the switching operation with respect to projection magnification is issued to thereby stop the motor M which drives pulley 7. Likewise, clockwise rotation of pulleys 7,7' (i.e., opposite to the arrow direction) moves frame 4 to the right, so that the projecting portion 4B above lens B abuts an actuator 9A of microswitch 9, thereby closing the NO contact of that microswitch. Closure of the NO contact of microswitch 9 also issues a signal indicating completion of the magnification changing (or "lens switching") operation, thereby again stopping the motor M which drives pulley 7. The position of frame 4 when driven to the far right is the service position for lens A, while the position of frame 4 when driven to the far left is the service position for lens B.

Figure 3:
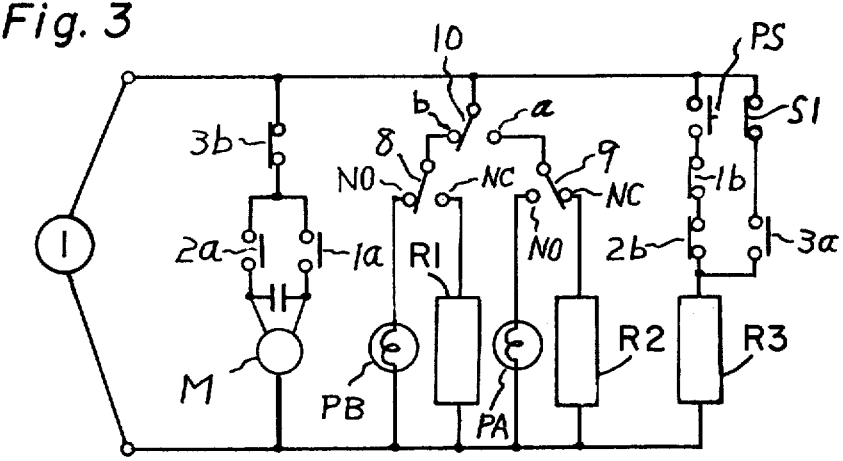
FIG. 3 is an operation control circuit diagram.

FIG. 3 shows an operation control circuit according to the invention. This figure presents the condition where frame 4 in FIG. 2 is positioned to the far left, denoting that lens B is in service. At this time, the NO contact of microswitch 8 is closed and the NC ("normally closed") contact thereof is open, while the No contact of switch 9 is open and the NC contact thereof is closed. As mentioned above, a signal indicative of completion of the magnification switching operation can be issued either through microswitch 8 or microswitch 9. In FIG. 3, however, the next signal as to the completion of a magnification switching operation will issue by means of microswitch 8. In the circuit of FIG. 3, the magnification selection switch 10 is set on the side of its contact *b*, such that a lamp PB is supplied with electric current through switch 8 and its NO contact, the lit condition of PB indicating that lens B is in the service condition. Under these conditions, if a starting button PS for initiating reproduction is momentarily depressed, then electric current is supplied to a relay R3, since relays R1 and R2 are both de-energized at this time, their respective normally closed contacts 1*b*,2*b* therefore being in the closed condition. Upon energization of R3, its holding contact 3*a* is closed to maintain the energizing circuit through the normally closed contacts of a switch S1. Then, by virtue of closure of other normally open contacts of relay R3 (not shown), the reproducing operation is carried out in known fashion, the switch S1 being opened by means of a mechanism (not shown, but known) upon completion of reproduction with the result that the supply of electric current for the reproducing operation is stopped.

Relay R3 is thus maintained energized during the reproducing operating, and a normally closed contact 3b of relay R3 is opened. As is evident from FIG. 3, contact 3b is connected in the electric current supply circuit for the reversible rotation motor M. Since contact 3b is open, there is no possibility of motor M being operated by mistake during the reproducing operation, i.e., there is no possibility of either projection lens being moved during the reproduction. No such movement can occur until after the electric current supply to relay R3 is interrupted at the completion of the reproducing operation.

A detailed description for the case where the magnification is changed from that of lens B to tht of lens A will now be given. For this purpose, switch 10 is thrown to the contact a. Since the microswitch 9 is in the free condition, its NC contact therefore being closed, electric current is supplied to relay R2 through switch 10, contact a, switch 9 and its contact NC. On the other hand, since the contact b of switch 10 has opened. the lamp PB is no longer illuminated, but neither is the lamp PA illuminated, thus indicating that the magnification is in process of being changed. Now, when electric current is supplied to relay R2, its normally closed contact 2b is opened, thus breaking the circuit to relay R3, so that even if button PS is depressed by mistake, relay R3 cannot be energized, and accordingly such depression of PS will not commence the reproducing operation. On the other hand, the normally open contact 2a of relay R2 is now closed and electric current is supplied to motor M, so that the motor will drive pulley 7 in the direction opposite to the arrow direction shown in FIG. 2.

Even though the actuator 8A of switch 8 is free to close the NC contact of that switch as the lens frame 4 is moved to the right, electric current will not be supplied to relay R1 since switch 10 has been transferred to the side of contact a. When frame 4 has been moved to its rightmost position and the actuator of switch 9 is pressed, then the NC contact of switch 9 is opened, the NO contact closed, and relay R2 is de-energized again thus opening contact 2a and stopping motor M. Contact 2b is likewise closed, thus bringing about conditions for reproduction and, furthermore, electric current is supplied to lamp PA to indicate that lens A is ready for operation. If the button PS is depressed under these last conditions, then reproduction is commenced as previously described.

Lastly, a description will be given for the case where lens B is returned to the service condition. To this end, switch 10 is thrown to the side of contact b. Since lens frame 4 had been driven to the right, the NO contact of switch 9 is closed, whereas the NC contact of switch 8 is closed. Accordingly, electric current is supplied to relay R1 by way of switch 10, contact b, switch 8, and contact NC thereof so that relay R1 is energized, closing its normally open contact 1a with the result that motor M is rotated in a direction opposite to that previously described, thus driving pulley 7 in the arrow direction shown in FIG. 2. As a further result, since the normally closed contact 1b of relay R1 is now open, relay R3 is isolated such that even if button PS is depressed by mistake, a reproducing operation will not result. When lens frame 4 is driven to its leftmost position, then actuation of lever 8a opens the NC contact of switch 8 to interrupt the supply of electric current to relay R1, thereby stopping motor M. At the same time, the NO contact of switch 8 closes and electric current is supplied to lamp PB, thus indicating that lens B is again in service. Furthermore, since the normally closed contact 1b of relay R1 has again closed, a reproducing operation likewise becomes possible. Motor M is of a condensor starting type and thus the rotational direction of the motor M depends on which one of the two sets of field coils (not shown) is in series with the condensor.

FIG. 3 shows a circuit diagram wherein completion of the magnification changing (lens switching) operation is detected by on-off operations of parallel-connected relays R1,R2. Alternatively, relays may be provided in series with motor M, so that the aforesaid completion of the lens switching operation may be detected by on-off operations of motor M.

Figure 4:
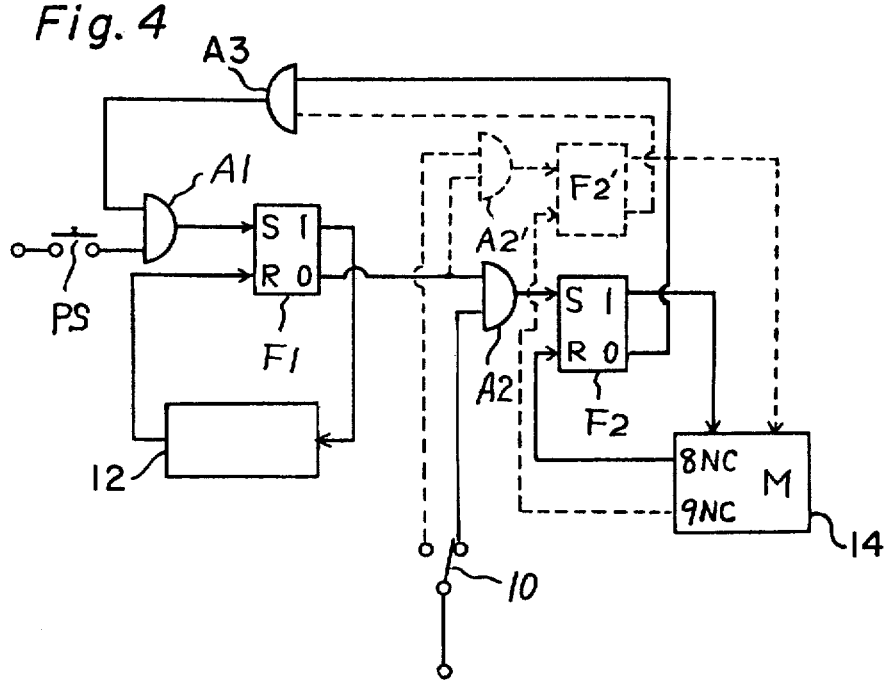
FIG. 4 is a block diagram of the operation control circuit in a general form.

Fig. 4 shows the circuit diagram of FIG. 3 in general form, wherein an AND gate A1 corresponds to the normally closed contacts 1b,2b of relays R1,R2 connected in series to the button PS as shown in FIG. 3, where the closed contacts 1b,2b signify that the relays R1 and R2 are not energized, i.e., a magnification changing operation is not being carried out. As a result, AND gate A1 is open in response to a signal representing the condition where the magnification changing operation is not under way, thus permitting copy production only in that case. The signal at the output of gate A1 sets a flip-flop F1, the set state of flip-flop F1 corresponding to the energizing of relay R3 in FIG. 3, and the storage function of the flip-flop representing the function of the holding circuit of relay R3. The reproducing mechanism 12 is operated by means of the set ("one") output of flip-flop F1. The flip-flop F1 is reset in response to a signal indicating completion of the reproducing operation. This resetting function is provided by the switch S1 of FIG. 3, it will be recalled.

Another AND gate A2 corresponds to the normally closed contact 3b of relay R3 inserted in the power circuit of motor M, thus indicating that the motor is operable only when flip-flop F1 is reset — i.e., only when reproduction has been completed (this condition also being that prevailing prior to the start of reproduction) — and that a change in magnification may not be carried out during a reproducing operation. A signal at the output of gate A2 sets a flip-flop F2. The set ("one") output of flip-flop F2 controls the magnification changing mechanism 14. As drawn, it drives motor M in a direction, for example, such that microswitch 8 is actuated and the NC contact thereof is opened, flip-flop F2 thus being reset. The reset output signal from flip-flop F2 is fed to AND gate A1 as a magnification change completion signal. The solid line of FIG. 4 is only representative of one of the lenses A and B, while the dotted line shows equivalent structure (A2', F2', 9NC) for the other of the lenses. This dotted line is connected in parallel to the above-described solid line circuit by way of an AND gate A3 and the magnification selection switch 10. Though AND gates A2 and A2', and flip-flop F2 and F2' are identical to each other, respectively, the relationship between F2, F2' and the circuit shown in FIG. 3 is not simple. For instance, the entire arrangement of the series system of A2 and F2 corresponds to the FIG. 3 arrangement including the microswitch 8, and NC contact thereof, relay R1, and normally closed contact 3B of relay R3. Accordingly, the closed condition of the NC contact of microswitch 8 corresponds to the set condition of flip-flop F2, while the closed condition of the NO contact of that microswitch corresponds to the reset condition of this flip-flop.

In passing, it may be noted that thus far the description has only referred to a reproducing apparatus in which reproduction magnification changes are achieved by switching lenses of different focal lengths into the optical path. Nevertheless, the present invention may be applied to a reproducing apparatus wherein the projecting lenses are fixed and a mirror in the optical path is moved so as to change the length of the optical path in order to change the reproduction magnification, and also applied to reproducing apparatuses of other types which likewise permit change in magnification for reproduction. In addition, although the description has been referred to a device which controls all the mechanisms within the apparatus, including the reproduction-projection mechanism, it will be understood from the viewpoint of the scope of the invention that the device need not necessarily control the entire reproduction apparatus, it being sufficient if the device only controls the reproductionprojection mechanism.

As is apparent from the foregoing description, the operation control device of the present invention prevents reproduction and projection during a magnification changing operation even if the button used in starting a reproduction cycle is depressed by mistake, and avoids possibility of the occurrence of a magnification changing operation during the reproduction and projection. Thus, this structure prevents failure in reproduction and the inadvertent but unwanted use of photosensitive paper.

What is claimed is:

1. An operation control device for use in a reproducing apparatus having a reproduction-projection mechanism together with drive means therefor, said mechanism being operable to form an image of a document, and including projectionmagnification changing means operable to vary the size of the image to be formed by the reproduction-projection mechanism, wherein the improvement comprises:
    means for producing a first signal in response to completion of a projection-magnification changing operation,
    a first circuit for actuating the drive means, said first circuit being closed in response to a signal from the signalproducing means,
    a second signal-producing means indicating completion of an operation of the mechanism,
    a second circuit for actuating the projection-magnification changing means, said second circuit being closed in response to completion of an operation by the reproduction-projection mechanism, and
    a manual control and memory means associated with said first circuit, said memory means being settable to a discrete state indicative of an operation of the manual control and said changing means being actuated in response jointly to the discrete state of the memory means and the signal from said second signal-producing means, 2. The apparatus of claim 1 wherein the means for reproduction of images of variable sizes comprises a further mechanism for selective change of image magnification by movement of optical elements, including a normally disconnected source of energy for actuating said further mechanism, and means for initiating a change of magnification said means producing a signal indicative of completion of said change is a first signal-producing means; the mechanism for reproduction-projection is cyclic and includes a second signal-producing means indicating completion of a reproduction cycle; and wherein said first circuit comprises a first AND gate having two inputs and an output, one of the two inputs being connected to the first signal-producing means, the other input being connected to said energy source, and the output being connected to said drive means; a second AND gate having two inputs and an output, one of the two inputs being connected to the initiating means, the other input being connected to said second signal-producing means, and the output being connected to means operable to connect said normally disconnected source of energy to said further mechanism in response to passage of a signal through said second AND gate.

3. The apparatus of claim 1, wherein said change in magnification is effected by movement of a discrete one of a pair of optical elements to an imaging position, and further including: a two-position, manually operable, bi-stable magnification selection switch and at least three flip-flops, a first one of said flip-flops being settable to a "one" state to effect a cycle of reproduction by the reproducing mechanism and resettable to a "zero" state in response to completion of the cycle, the second and third flip-flops being settable to a "one" state to drive reversibly the magnification change mechanism in a respective direction for said movement of a discrete one optical element, the setting of said second and third flip-flops occurring through respective two-input AND gates having the "zero" state of said first flip-flop as one input and an enabling electrical control as the other input through said two-position switch when located in a related one of said two positions, means operative in response to the entry of each optical element into imaging position and effective to reset the set one of the second and third flip-flops; a print switch; another two-input AND gate having the reset state of said second and third flip-flops in combination as one input and an activating electrical control through said print switch when closed as the other input, the output of said another AND gate being connected to said one flip-flop to effect the setting thereof in response to a signal passing through said another AND gate.

4. The apparatus of claim 3, wherein the optical elements are lenses.

5. In an electrophotographic reproduction apparatus having a reproducing cycle together with mechanism operable to change the magnification of the image to be formed in a reproducing cycle, the improvement comprising
    drive means for the magnification-changing mechanism,
    first signal-producing means responsive to completion of the operation of the mechanism,
    second signal-producing means responsive to completion of the reproducing cycle,
    a first conditionally-enabled control operable to activate said drive means,
    a second conditionally-enabled manual control for initiating a reproducing cycle,
    first means enabling said second manual control in response to a signal from said first signal-producing means, and second means enabling said first manual control in response to a signal from said second signal-producing means, whereby mutually exclusive operation of said magnification changing means and said reproduction mechanism is provided.

6. The aparatus defined in claim 5, further including at least one respective relay assoicated with each of said first and second manual controls, each said relay having normally closed contacts thereof forming part of said enabling means.

7. The apparatus of claim 5, wherein said drive means comprise a motor having a pair of terminals said first enabling means comprises a pair of relays, each having a normally closed contact and a normally open contact, the second manual control and the normally closed all being connected in series and each normally open contact being connected to a discrete one of the pair of terminals; and said second enabling means comprise a third relay having a normally closed contact connected in common to the normally open contacts of the pair of relays.

8. The apparatus of claim 7, wherein said change in magnification is effected by movement of a discrete one of a pair of optical elements into an imaging position, said motor provides a reversible drive, and said first manual control comprises a two-position, bi-stable switch energizing a discrete one of said pair of relays in response to transfer of the switch from one of said two positions to the other of the two positions, the motor drive being reversed thereby.

9. The apparatus of claim 8, wherein said third relay is energized in response to operation of said second manual control, said relays are provided with holding circuits and a corresponding one of said pair of relays is energized and closes said normally open contact thereof in response to transfer of said switch, the closure being maintained because of the relay holding circuit, but being ineffective when said third relay is energized, said normally closed contact of this last-mentioned relay then being open thereby to prevent operation of said motor through the now closed normally open contact of the energized one of said pair of relays; and means operable to interrupt the holding circuit of the third relay in response to completion of the reproducing cycle initiated by the operation of the second manual control.

10. The apparatus of claim 9 wherein the optical elements are lenses.

* * * * *